United States Patent Office 3,346,397
Patented Oct. 10, 1967

3,346,397
PROCESS FOR DELAYING SENESCENCE OF PINEAPPLE FRUIT
Willis A. Gortner, Honolulu, Hawaii, assignor to Pineapple Research Institute, Honolulu, Hawaii, an association of Hawaii
No Drawing. Filed July 17, 1963, Ser. No. 295,841
7 Claims. (Cl. 99—154)

This invention relates to novel methods for delaying the post-harvest ripening, or senescence, of pineapple fruit and, more specifically, to novel methods of delaying the senescence of mature pineapple fruit by treating it, slightly before or after it is harvested, with an aromatic, heterocyclic, or aromatic alkylcarboxylic acid or with an ester, salt, amide, or nitrile derivative of such an acid.

Pineapple fruit which is to be marketed fresh (in contrast to canned, frozen, or otherwise processed fruit) is picked when it is green or partially green since several weeks may elapse from the time the fruit is harvested until it reaches the consumer. During the interim, the fruit will continue to mature; and, when it reaches the consumer, it will, at least in theory, be at the desired degree of ripeness.

It is well known that pineapple fruit harvested green and ripened during transit is, in general, inferior in texture, taste, and quality to pineapple fruit which is allowed to mature before it is harvested. However, it has heretofore been impossible to delay senescence of the mature fruit long enough to permit it to be shipped to the consumer and arrive in good condition.

Accordingly, it is an important object of the present invention to provide novel methods for delaying the senescence of pineapple fruit, permitting the fruit to be harvested substantially at maturity and thereafter shipped and marketed as fresh fruit, thereby making it practical to market fresh pineapple fruit of much higher quality than has heretofore been possible.

In general, the novel process provided by the present invention for delaying the senescence of mature pineapple fruit consists of treating the surface of the mature fruit with an aromatic, heterocyclic, or aromatic alkylcarboxylic acid or acid compound. The fruit may be treated in any convenient manner; e.g., by spraying or sponging it or by dipping it in a solution of, or a dust containing, the appropriate chemical. This process may be employed in conjunction with other processes for preventing senescence during storage and transit such as refrigeration, for example. The fruit may be treated after harvesting and may be treated shortly prior to picking (one day to not more than three weeks) and this is included in the reference to post-harvesting treatment.

Various chemicals have heretofore been sprayed on growing pineapple plants to change the time at which the green fruit matures on the plant so that ripe fruit can be harvested and quickly delivered to adjacent canneries over an extended period of time to permit efficient cannery operation. These chemicals are applied six-eight weeks before the harvest and act by exerting a temporary effect on the growing plant, but they are ineffective to control the senescence of the mature fruit after it has been harvested. This method of treating growing pineapple plants is widely used and is disclosed in detail in United States Patent No. 2,527,499 to Ferdinand P. Mehrlich.

There is a high degree of specificity in the chemicals operable in the process of the present invention. Chemicals which are operative in Mehrlich's method (which involves the treating of green as opposed to mature or substantially mature fruit) are not necessarily (and in most cases will not be) operative in applicant's method. For example, Mehrlich discloses that a mixture of 2-monochlorophenoxyacetic and 2,4,6-trichlorophenoxyacetic acids will delay the ripening of pineapple fruit on the plant when applied to the growing plant. Both of these acids are inert and have no effect on senescence when applied to the mature fruit.

That a given chemical is ineffective in delaying senescence of fruits other than pineapple is no indication that the chemical will act similarly on pineapple. For example, Mitchell and Marth [Botanical Gazette 106:199 (1944)] found that 2,4-dichlorophenoxyacetic acid, a chemical operable in the process of this invention, is ineffective to stimulate ripening when applied to tomatoes, peppers, or persimmons. Marth and his co-workers [Science, 111:331 (1950)] found that 2,4,5-trichlorophenoxyacetic acid accelerated the ripening of apples and peaches when sprayed on fruit on the tree. On the other hand, Stewart and his co-workers [Proceedings of the American Society for Horticultural Science 59:327 (1952)] found that both of the chemicals referred to above delay the yellowing of lemons.

While producing the invention more than 300 chemicals closely related to those found to be active for delaying senescence were discovered to be inactive. This further points up the high degree of specificity in the chemicals operable in the process of the invention.

Another specific object of the present invention is the provision of novel methods for delaying senescence of mature pineapple fruit by treating the fruit substantially at maturity with an aromatic, heterocyclic, or aromatic alkylcarboxylic acid compound, slightly before or after the fruit is harvested.

The term "acid compound," as employed in this application, is meant to include the free acid and derivatives of the acid including esters, salts, (for example, alkali metal or ammonium salts or salts with organic amines), amides, and nitrile derivatives.

Other objects and further novel features of the present invention will become more fully apparent from the appended claims and from the following detail description and examples which illustrate, but do not limit the claims of the invention. In these examples, the terms "one-fourth yellow," "half yellow," "full yellow," etc., indicate increasing degrees of ripeness.

*Example I*

Mature pineapple fruit with only about one-fourth of the eyes yellow were dipped in an aqueous solution of the sodium salt of 1-naphthaleneacetic acid at a concentration of 100 milligrams per liter so that the fruit but not the crowns were thoroughly wetted.

After 9 days at room temperature, the treated fruit were still less than half-yellow while comparable untreated fruit had turned completely yellow and showed evidence of being overripe. The treated fruit continued to have an excellent flavor and firm texture after storage.

Results similar to those produced by using the method of Example I may be obtained by using the following di- and polycyclic aromatic acids or esters, salts, amides, or nitrile derivatives of these acids:

3,4-dihydro-1-naphthaleneacetic acid,
ε-(1-naphthyl)hexoic acid,
β-(1-naphthoyl)propionic acid,
α-(2-naphthoxy)propionic acid,
2-naphthoxyacetic acid,
4-phenanthreneacetic acid, and by using other salts and esters, amides, or nitrile derivatives of 1-naphthaleneacetic acid or the free acid.

*Example II*

Freshly picked pineapple in which approximately half of the eyes had turned yellow and with the crowns still intact were completely immersed in a solution containing 100 milligrams per liter of 2,4,5-trichlorophenoxyacetic acid which had first been converted to the sodium salt through the addition of a minimal amount of 40% sodium hydroxide solution. The fruit were then removed from the solution and stored in the open. After 14 days at 75° F., the treated fruit were not at the full yellow stage of ripeness, whereas untreated control pineapple were completely yellow within 5 days. The flavor score of the treated fruit rated good to excellent, whereas the untreated controls rated fair to poor in flavor after two weeks holding. Adverse changes in texture and shell color seen in the controls were not evident in the treated fruit. When the 2,4,5-trichlorophenoxyacetic acid concentration was only 1 milligram per liter, the treated fruit were somewhat delayed in further ripening and were not full yellow until 9 days of storage.

Example III

Pineapple picked at the half yellow stage of ripeness were immersed so that the fruit but not the crowns were wetted briefly in a solution containing 1000 milligrams per liter of 2,4,5-trichlorophenoxyacetic acid which had been brought into solution by the addition of a small amount of sodium hydroxide. The solution also contained 5 lbs. of the fungicide captan per 100 gallons of water. After 13 days storage at room temperature, the treated fruit were nearly full yellow, whereas the control pineapple receiving only the captan dip had been full yellow since the fifth day. The control fruit all had a soft and spongy texture and overripe or "flat" flavor. The treated fruit all had a firm and crisp texture and the flavor was essentially normal for ripe pineapple.

Example IV

Half-yellow pineapple were treated according to the procedure set forth in Example I, substituting 4-chlorophenoxyacetic acid for 1-naphthaleneacetic acid. After 6 days at 75° F., the untreated control fruit were all full yellow whereas the treated fruit were only three-fourths yellow.

Example V

Pineapple fruit with about one-fourth of the eyes yellow were treated according to the procedure set forth in Example I, substituting either 4-bromophenoxyacetic acid or 4-fluorophenoxyacetic acid for 1-naphthaleneacetic acid. After 6 days for further ripening, the control fruit were more than three-fourths yellow. At this time, the pineapple treated with 4-bromophenoxyacetic acid were approximately two-thirds yellow and those treated with 4-fluorophenoxyacetic acid were only half yellow.

Example VI

Pineapple with about one-fourth of the eyes yellow were treated according to the procedure set forth in Example I, substituting either 2,4,5-trichlorophenoxyacetic acid or 2,4,5-trichlorophenoxyacetamide or 2,4,5-trichlorophenoxyacetonitrile for 1-naphthaleneacetic acid. It required only 4 days for half of the green eyes of the control fruit to ripen and turn yellow, but the three different lots of treated fruit all required 10 days for half of the green eyes to turn color.

Results similar to those produced by the chemicals identified in Examples II–VI may be obtained by using the following substituted phenoxyacetic acids or esters, salts, amides, or nitrile derivatives of these acids:

3-chlorophenoxyacetic acid
4-chlorophenoxyacetic acid
2,4-dichlorophenoxyacetic acid
2,3-dichlorophenoxyacetic acid
3,4-dichlorophenoxyacetic acid
2,4,5-trichlorophenoxyacetic acid
2-methyl-4-chlorophenoxyacetic acid
2,3-dimethyl-4-chlorophenoxyacetic acid
2,5-dimethyl-4-chlorophenoxyacetic acid
2,4-dichloro-3,5,6-trimethylphenoxyacetic acid, or by employing any of the above-listed phenoxyacetic acids or acid derivatives with a different halogen substituted for chlorine in the aromatic ring, or by using the following free acids or esters, salts, amides, or nitrile derivatives thereof:

2,4,5-trimethylphenoxyacetic acid
2-methoxy-4-methylphenoxyacetic acid
2,3-dimethylphenoxyacetic acid.

Example VII

One-fourth yellow pineapple fruit were briefly immersed up to the crowns in a solution of 5 lbs. of captan per 100 gallons of water in which had been dissolved (with the aid of a little alkali) 100 milligrams per liter of 2-methylindole-3-acetic acid. The fruit were then stored in open air for 11 days. Half of the green area on the control fruit yellowed within 5 days, whereas the treated fruit had not yet yellowed to this extent even after 11 days.

Similar results may be obtained by substituting the following heterocyclic acids or esters, salts, amides, or nitrile derivatives of these acids:

benzothiazole-2-oxyacetic acid,
4-thianaphtheneacetic acid, or by employing esters, salts, amides, or nitrile derivatives of 2-methylindole-3-acetic acid.

Example VIII

Pineapple were treated in the manner described in Example VII, substituting 2,3,6-trichlorophenacetic acid for the 2-methylindole-3-acetic acid. Within 8 days, the control fruit were full yellow, whereas the treated fruit were then half-yellow and had a more firm texture.

Essentially the same results as were obtained in Example VIII may be obtained by employing the following halogen substituted phenylacetylic acids or esters, salts, amides, or nitrile derivatives of these acids:

2,4-dichlorophenylacetic acid
2,5-dichlorophenylacetic acid
3,4-dichlorophenylacetic acid
2,4,5-trichlorophenylacetic acid
2,3,6-trichlorophenylacetic acid or esters, salts, amides, or nitrile derivatives of 2,3,6-trichlorophenylacetic acid, or any of the foregoing chemicals with a different halogen substituted for chlorine in the aromatic ring.

Example IX

Pineapple were treated in the manner described in Example VII, substituting α-(2,5-dimethylphenoxy) propionic acid for the 2-methylindole-3-acetic acid. Similar results were observed.

Results similar to those obtained by the process discussed in Example IX may be obtained by employing any of the group of chemicals including the following substituted phenoxy-α-propionic acids and esters, salts, amides, and nitrile derivatives thereof:

α-(2-chlorophenoxy)propionic acid
α-(3-chlorophenoxy)propionic acid
α-(4-chlorophenoxy)propionic acid
α-(2,4-dichlorophenoxy)propionic acid
α-(3,4-dichlorophenoxy)propionic acid
α-(2,5-dichlorophenoxy)propionic acid
α-(2,4,5-trichlorophenoxy)propionic acid or by employing any of the foregoing chemicals with a methyl group substituted for chlorine in the aromatic ring, or by employing any of the above-listed chemicals with a different halogen substituted for chlorine in the aromatic ring.

Example X

One-fourth yellow pineapple fruit were treated in the manner described in Example VII, substituting 2,3,5,6- tetrachlorobenzoic acid for the 2-methylindole-3-acetic acid. Essentially similar results were observed.

Similar results may be obtained by employing salts of 2,3,5,6-tetrachlorobenzoic acid or 3,4-dimethoxycinnamic acid or salts thereof.

*Example XI*

Pineapple fruit still on the plants in the field were thoroughly wetted with sprays containing either sodium alpha-naphthaleneacetate or sodium 2,4,5-trichlorophenoxyacetate at a concentration of 500 milligrams per liter of water. The fruit were at different stages of ripeness, but were near full maturity, ranging from 1 day to 3 weeks before normal picking at ¼ yellow shell. All fruit were left on the plants until they reached ¼ yellow shell, and were then picked and held in the shade until fully yellow.

The untreated controls for fruit sprayed when ¼ yellow continued to ripen rapidly when picked (the fruit were picked one day after treatment) and were fully yellow in 6 days. The sprayed fruit did not become fully yellow until 16 days after picking.

The controls for fruit sprayed when just starting to turn yellow were picked at ¼ yellow 3 days later. Eight days after picking they were fully yellow. However, the treated fruit took longer to reach the ¼ yellow stage on the plant, and a delay in reaching complete shell yellowing after picking was also observed. The fruit treated with naphthaleneacetate took 12 days to yellow fully, and the trichlorophenoxyacetate treatment lengthened the post-harvest yellowing time to over 3 weeks.

Untreated controls for fruit sprayed 5 days away from ¼ yellowing required only 8 days to yellow fully after picking. In addition to delaying the picking time, the naphthaleneacetate treatment lengthened post-harvest ripening time to 14 days; and the trichlorophenoxyacetate-treated fruit were not even ¾ yellow after 14 days and needed over 3 weeks to yellow fully.

Control fruit for treatments made 12 days before normal early yellowing were fully yellow 7 days after picking at ¼ yellow stage. The fruit receiving the naphthaleneacetate spray were not all fully yellow until 12 days after picking, and 2,4,5-trichlorophenoxyacetate caused even slower ripening.

The fruit sprayed with naphthaleneacetate 19 days before the normal ¼ yellow stage were similar to the control fruit in regard to post-harvesting ripening, but those treated with the 2,4,5-trichlorophenoxyacetate showing a delay both in reaching the picking stage and in subsequent post-harvest yellowing.

The amounts and concentrations of the chemicals used in practicing my novel method may vary from application to application. Any contact with the chemical employed will produce the desired results to some extent.

Each chemical may have an upper limit, as regards amount and concentration, because, beyond such limit, the chemical would be present on the pineapple fruit in such an amount as to be toxic. The upper limit is because of toxicity and not because beyond such limit the chemical becomes ineffective in delaying senescence.

For many of the chemicals which may be employed in the practice of my invention, as discussed, it has been found that a concentration of 100 parts per million is satisfactory although this concentration is not critical.

In general, only a single application of the treating material is necessary or desired. The time for which the treating solution is contacted with the pineapple fruit is generally not critical. For example, momentary dips of the fruit in the treating solution have been found effective. Contact of the treating material and the pineapple fruit for longer periods may alter the effect of the chemical and may lessen the required concentration of the chemical.

From the foregoing, it will be apparent that the present invention provides a novel method of delaying the senescence of pineapple fruit which represents a substantial improvement over traditional methods such as refrigeration. As indicated above, the achievement of this novel end result is of substantial commercial importance since it permits delivery to the consumer of fresh pineapple fruit or markedly superior quality in comparison to that which it has been possible to provide in the past.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. The method of producing pineapple fruit of superior market quality, comprising the steps of:
   (a) harvesting said fruit only after said fruit has reached substantially full maturity to thereby obtain to the maximum extent the desirable qualities attainable by natural ripening of pineapple fruit; and
   (b) delaying the post-harvest senescence of said fruit by applying to the full-grown fruit after it has become sufficiently ripe that at least part of the eyes of the fruit have turned yellow and during a period beginning about three weeks before and continuing after the harvesting of the fruit a material selected from the group consisting of the following free di- and polycyclic aromatic acids and esters, salts, amides, and nitrile derivatives thereof:
   1-naphthaleneacetic acid
   3,4-dihydro-1-naphthaleneacetic acid
   ϵ-(1-naphthyl)hexoic acid
   β-(1-naphthoyl)propionic acid
   α-(2-naphthoxy)propionic acid
   4-phenanthreneacetic acid,
   the amount of said material applied being adequate to substantially delay senescence of the treated fruit, but sufficiently small to be virtually nontoxic.

2. The method of producing pineapple fruit of superior market quality, comprising the steps of:
   (a) harvesting said fruit only after said fruit has reached substantially full maturity to thereby obtain to the maximum extent the desirable qualities attainable by natural ripening of pineapple fruit; and
   (b) delaying the post-harvest senescene of said fruit by applying to the full-grown fruit after it has become sufficiently ripe that at least part of the eyes of the fruit have turned yellow and during a period beginning about three weeks before and continuing after the harvesting of the fruit a material selected from the group consisting of the following free heterocyclic acids and esters, salts, amides, and nitrile derivatives thereof:
   benzothiazole-2-oxyacetic acid
   2-methylindole-3-acetic acid
   4-thianaphtheneacetic acid,
   the amount of the material applied being adequate to substantially delay senescence of the treated fruit, but sufficiently small to be virtually non-toxic.

3. The method of producing pineapple fruit of superior market quality, comprising the steps of:
   (a) harvesting said fruit only after said fruit has reached substantially fully maturity to thereby obtain to the maximum extent the desirable qualities attainable by natural ripening of pineapple fruit; and
   (b) delaying the post-harvest senescence of said fruit by applying to the full-grown fruit after it has become sufficiently ripe that at least part of the eyes of the fruit have turned yellow and during a period beginning about three weeks before and continuing after the harvesting of the fruit a material selected from the group consisting of the following free halogen-substituted phenylacetic acids and esters, salts, amides, and nitrile derivatives thereof:
  2,4-dichlorophenylacetic acid
  2,5-dichlorophenylacetic acid
  3,4-dichlorophenylacetic acid
  2,4,5-trichlorophenylacetic acid
  2,3,6-trichlorophenylacetic acid, and
    any of the foregoing chemicals with a different halogen substituted for chlorine in the aromatic ring,
the amount of said material applied being adequate to substantially delay senescence of the treated fruit, but sufficiently small to be virtually non-toxic.

4. The method of producing pineapple fruit of superior market quality, comprising the steps of:
  (a) harvesting said fruit only after said fruit has reached substantially full maturity to thereby obtain to the maximum extent the desirable qualities attainable by natural ripening of pineapple fruit; and
  (b) delaying the post-harvest senescence of said fruit by applying to the full-grown fruit after it has become sufficiently ripe that at least part of the eyes of the fruit have turned yellow and during a period beginning about three weeks before and continuing after the harvesting of the fruit a material selected from the group consisting of the following free halogen-substituted phenoxyacetic acids and esters, salts, amides, and nitrile derivatives thereof:
    3-chlorophenoxyacetic acid
    4-chlorophenoxyacetic acid
    2,4-dichlorophenoxyacetic acid
    2,3-dichlorophenoxyacetic acid
    3,4-dichlorophenoxyacetic acid
    2,4,5-trichlorophenoxyacetic acid
    2-methyl-4-chlorophenoxyacetic acid
    2,3-dimethyl-4-chlorophenoxyacetic acid
    2,5-dimethyl-4-chlorophenoxyacetic acid
    2,4-dichloro-3,5,6-trimethylphenoxyacetic acid;
  any of the above chemicals with a different halogen substituted for chlorine in the aromatic ring; and the following three substituted phenoxyacetic acids and esters, salts, amides, and nitrile derivatives thereof:
    2,4,5-trimethylphenoxyacetic acid
    2-methoxy-4-methylphenoxyacetic acid
    2,3-dimethylphenoxyacetic acid,
the amount of said material applied being adequate to substantially delay senescence of the treated fruit, but sufficiently small to the virtually non-toxic.

5. The method of producing pineapple fruit of superior market quality, comprising the steps of:
  (a) harvesting said fruit only after said fruit has reached substantially full maturity to thereby obtain to the maximum extent the desirable qualities attainable by natural ripening of pineapple fruit; and
  (b) delaying the post-harvest senescence of said fruit by applying to the full-grown fruit after it has become sufficiently ripe that at least part of the eyes of the fruit have turned yellow and during a period beginning about three weeks before and continuing after the harvesting of the fruit a material selected from the group consisting of the following free substituted phenoxy-α-propionic acids and esters, salts, amides, and nitrile derivatives thereof:
    α-(2-chlorophenoxy)propionic acid
    α-(3-chlorophenoxy)propionic acid
    α-(4-chlorophenoxy)propionic acid
    α-(2,4-dichlorophenoxy)propionic acid
    α-(3,4-dichlorophenoxy)propionic acid
    α-(2,5-dichlorophenoxy)propionic acid
    α-(2,4,5-trichlorophenoxy)propionic acid; and any of the foregoing chemicals with a methyl group substituted for chlorine in the aromatic ring; and any of the above chemicals with a different halogen substituted for chlorine in the aromatic ring,
the amount of said material applied being adequate to substantially delay senescence of the treated fruit, but sufficiently small to be virtually non-toxic.

6. The method of producing pineapple fruit of superior market quality, comprising the steps of:
  (a) harvesting said fruit only after said fruit has reached substantially full maturity to thereby obtain to the maximum extent the desirable qualities attainable by natural ripening of pineapple fruit; and
  (b) delaying the post-harvest senescence of said fruit by applying to the full-grown fruit after it has become sufficiently ripe that at least part of the eyes of the fruit have turned yellow and during a period beginning about three weeks before and continuing after the harvesting of the fruit a material selected from the group consisting of the following free acids and salts thereof:
    2,3,5,6-tetrachlorobenzoic acid
    3,4-dimethoxycinnamic acid,
the amount of said material applied being adequate to substantially delay senescence of the treated fruit, but sufficiently small to be virtually non-toxic.

7. The method of producing pineapple fruit of superior market quality, comprising the steps of:
  (a) harvesting said fruit only after said fruit has reached substantially full maturity to thereby obtain to the maximum extent the desirable qualities attainable by natural ripening of pineapple fruit; and
  (b) delaying the post-harvest senescence of said fruit by applying to the fruit after harvesting a material selected from the group consisting of 2-naphthoxyacetic acid and esters, salts, amides, and nitrile derivatives thereof, the amount of said material applied being adequate to substantially delay senescence of the fruit, but sufficiently small to be virtually non-toxic.

References Cited

UNITED STATES PATENTS

| | | | |
|---|---|---|---|
| 2,341,867 | 2/1944 | Hitchcock et al. | 99—154 XR |
| 2,341,868 | 2/1944 | Hitchcock et al. | 99—154 XR |
| 2,428,335 | 9/1947 | Mehrlich | 71—2.6 XR |
| 2,441,163 | 5/1948 | Mehrlich | 71—2.6 XR |
| 2,527,499 | 10/1950 | Mehrlich | 71—2.6 XR |

A. LOUIS MONACELL, *Primary Examiner.*

R. S. AULL, M. VOET, *Assistant Examiners.*

UNITED STATES PATENT OFFICE
CERTIFICATE OF CORRECTION

Patent No. 3,346,397　　　　　　　　　　　　　October 10, 1967

Willis A. Gortner

It is hereby certified that error appears in the above numbered patent requiring correction and that the said Letters Patent should read as corrected below.

Column 4, line 31, for "trichlorophenacetic" read -- trichlorophenylacetic --; line 37, for "phenylacetylic" read -- phenylacetic --; column 6, line 40, for "nontoxic" read -- non-toxic --; column 7, line 48, for "the" read -- be --.

Signed and sealed this 12th day of November 1968.

EAL)

ttest:

lward M. Fletcher, Jr.　　　　　　　　　　　　EDWARD J. BRENNER
:testing Officer　　　　　　　　　　　　　　　　Commissioner of Patents